INVENTOR
CARL-ERIK GRANQVIST
BY Larson and Taylor
ATTORNEYS

Jan. 5, 1971   CARL-ERIK GRANQVIST   3,552,860
REFRACTION MEASURING APPARATUS
Filed June 9, 1969   2 Sheets-Sheet 2

INVENTOR
CARL-ERIK GRANQVIST

BY  *Larson and Taylor*

ATTORNEYS

United States Patent Office 3,552,860
Patented Jan. 5, 1971

3,552,860
REFRACTION MEASURING APPARATUS
Carl-Erik Granqvist, Lidingo, Sweden, assignor to AGA Aktiebolag, Lidingo, Sweden, a corporation of Sweden
Filed June 9, 1969, Ser. No. 831,307
Claims priority, application Sweden, June 7, 1968, 7,648/68
Int. Cl. G01n 21/46
U.S. Cl. 356—128                                    7 Claims

ABSTRACT OF THE DISCLOSURE

A system for measuring the refractive index along a path is provided wherein two light signals, which are of different colors and which are intensity-modulated with different frequencies, are transmitted along the path to a receiver including a phase detector. The phase detector produces an output in accordance with the phase difference between the signals, which output is a measure of the difference in refractive index for the two colors. The receiver includes a photomultiplier tube which provides heterodyning of the signals to form a difference-frequency signal whose phase represents the phase difference between the two color signals. Each color is alternately modulated with one or the other of two frequencies resulting in a doubling of the signal at the receiver. One of the signals may be delayed at the transmitter so that the signals are of equal phase at the receiver, the receiver serving as a null instrument and the delay being a measure of the refractive index.

FIELD OF THE INVENTION

The present invention relates to systems for measuring distances using electromagnetic waves such as light and, more particularly, to an apparatus for measuring the refractive index along a light path.

BACKGROUND OF THE INVENTION

The use of electromagnetic wave energies such as light in measuring distances offer a number of very important advantages as compared with other approaches. However, to provide for very accurate measurements a number of parameters affecting the result must be determined. For example, it is important to know the refractive index along the path which the light travels. As is pointed out in more detail hereinbelow and as is set forth in the article "The Use of Atmospheric Dispersion for the Refractive Index Correction of Optical Distance Measurements," by M. C. Thompson and L. E. Wood, page 165 and following of "Electromagnetic Distance Measurement," Hilger & Watts Ltd., London, it is possible to determine the average value of the refractive index along a path by measuring the difference in phase delay for two signals of different colors traversing the path.

SUMMARY OF THE INVENTION

In accordance with the present invention a system is provided for measuring the phase delay for two signals of different colors traversing a path which provides a number of advantages as compared with other systems that might be devised for performing this function. In accordance with the present invention the two signals of different colors are modulated with a different modulation frequency and the phase difference between the modulated signals is measured at the receiving end. Each color is modulated alternatively with one or the other of first and second modulating frequencies which results in a doubling of the sensitivity of the system at the receiver.

In accordance with a presently preferred embodiment of the invention an apparatus for measuring refraction along a light path is provided which includes first emitter means for transmitting a first light signal of a first color along the light path and second emitter means for transmitting a second light signal of a second color along the light path and modulating means for modulating the intensity of the first signal and for modulating the intensity of the second signal. The modulating means includes a first generator for generating a signal of a first frequency, a second generator for generating a signal of a second frequency, and switching means for switching the generators between the modulating receiving inputs of the first and second emitter means such that the first generator is connected to the first emitter means and the second generator is connected to the second emitter means for a first switch position and the first generator is connected to the second emitter means and the second generator is connected to the first emitter means for a second switch position. A receiver for receiving the first and second light signals includes a phase detector for producing an output in accordance with the difference in phase between the first and second signals. The receiving means may further include heterodyning means responsive to the first and second signals for producing a difference-frequency signal which is applied to the phase detector, the heterodyning means preferably comprising a photomultiplier tube. The output of the phase detector may be used as a measurement of the refractive index or, in another embodiment, a delay line may be inserted for delaying one of the two signals before the transmission thereof in which case the delay necessary to produce a zero reading on a null instrument connected to the output of the phase detector provides a measurement of the refractive index.

Other features and advantages of the present invention will be set forth in or apparent from the description of preferred embodiments of the invention found hereinbelow.

DESCRIPTION OF THE PREFERRED EMBODIMENTS

Figure 1:
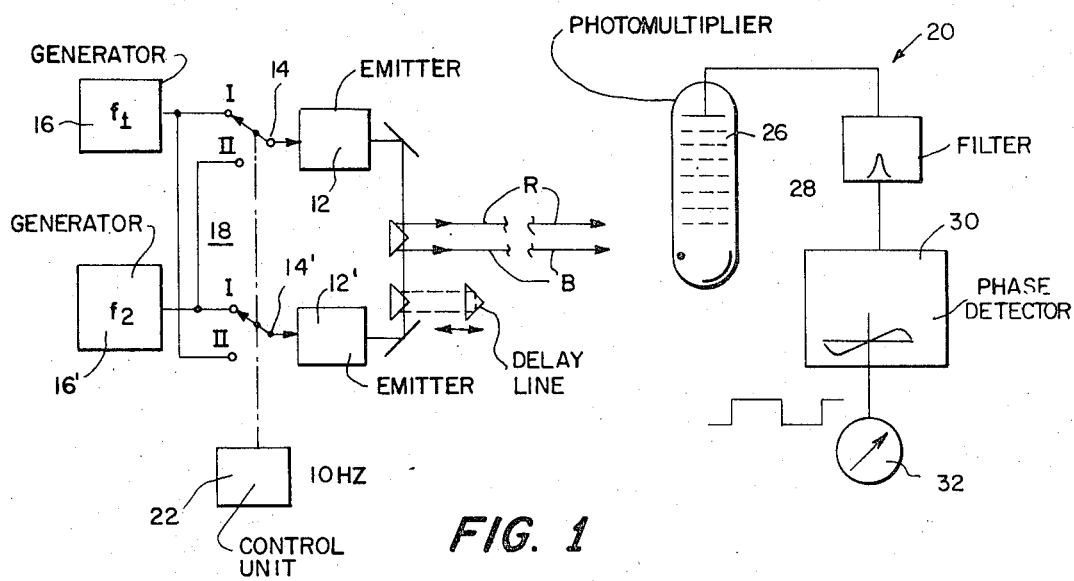
FIG. 1 is a schematic representation of a first embodiment of the invention including a transmitter for transmitting a light signal along a predetermined path and a receiver for receiving light reflected back from the end of the path.

Referring to FIG. 1, a transmitter generally denoted 10 includes an emitter 12 for transmitting a beam of red light denoted R and having a modulation input terminal 14 for receiving a modulation signal for modulating the intensity of the beam. Transmitter 10 includes a second, similar emitter 12' which emits a beam of blue light denoted B and has a modulation input 14'. The two beams R and B form a light signal which is transmitted toward the far end of a signal path to a reflector (not shown) which causes the light signal to be returned toward a receiver generally denoted 20. Alternatively, receiver 20 may be positioned at the end of the path.

Transmitter 10 further includes a first generator 16 which produces a signal of a frequency $f_1$ and a second generator 16' which produces a signal of frequency $f_2$. A double-throw, double-pole switch 18 provides for alternate connection of generators 16 and 16' to emitters 12 and 12'. Specifically, switch 18 in position I thereof connects generator 16 to modulation input 14 of emitter 12 and connects generator 16' to modulation input 14' of emitter 12'. In position II thereof, switch 18 connects generator 16 to input 14' of emitter 12' and connects generator 16' to input 14 of emitter 12. Switch 18 is periodically switched between positions I and II so that emitters 12 and 12' are alternately modulated by one or the other of the two modulating frequencies $f_1$, $f_2$, this periodic actuation of switch 18 being controlled by a control unit 22. Control unit 22 may operate at a relatively low frequency such as 10 Hz whereas frequencies $f_1$ and $f_2$ may, for example, be of the order of 30 mHz.

Transmitter 10 may also include an adjustable delay device 24 which is inserted in the path of the light beam produced by emitter 12' so that the blue signal B produced by emitter 12' may be suitably delayed as described hereinbelow.

Receiver 20 includes a photomultiplier tube 26 which is adapted to receive the signals R and B on the photocathode thereof and which amplifies the received signals in a conventional manner. It will be understood that because of the non-linearity of the photomultiplier 26 there will be heterodyning of the received signal and, consequently, the generation of a difference-frequency signal $f_1-f_2$, which is separated out by a filter 28 and applied to the input of a phase detector 30. The heterodyning process produces a component of the difference-frequency $f_1-f_2$ having a phase $\phi_1-\phi_2$, where $\phi_1$ and $\phi_2$ are the phases of the received signals $f_1$ and $f_2$, respectively. The term $\phi_1-\phi_2$ represents the difference in the phase delay over the signal path for the signals R and B. This difference is measured by phase detector 30 which may be of a conventional and well known type such as a Foster-Seeley phase discriminator.

Assuming that the above discussion applies with switch 18 in position I shown in FIG. 1, actuation of switch 18 by control unit 22 to position II thereof will cause emitters 12 and 12' to be modulated with frequencies $f_2$ and $f_1$, respectively and, consequently, the corresponding phase difference, which is denoted $\phi_1'-\phi_2'$, will produce a different output at phase detector 30 so that, as will become more clear from the discussion found hereinbelow, the output of phase detector 30 is of generally rectangular waveform as indicated. Further, as explained hereinbelow, the amplitude of the rectangular wave produced corresponds to the difference between the first phase difference $\phi_1-\phi_2$, produced by transmitter 10 with switch 18 in position I, and the second phase difference, $\phi_1'-\phi_2'$, produced by transmitter 10 with switch 18 in position II thereof. The amplitude of the rectangular waveform may be measured by a suitable measuring instrument denoted 36.

To consider the operation of the system of FIG. 1 in more detail, as is explained in the article by Thompson and Wood referred to hereinabove, the average refractive index over a path travelled by a light signal may be determined by measuring the difference in the refractive index for two different colors for that path.

The refractive index for a medium may be expressed in the form $1+N$, wherein N is a corrective term which is of the order of $3 \times 10^{-4}$ and depends on the temperature and the pressure of the atmosphere along the signal path. The values of N for the two colors discussed above, viz., red and blue will be designated $N_1$ and $N_2$, respectively. The velocity of a signal along the signal path may be represented by the formula $C_0/1+N$, where $C_0$ is a constant and thus the following expressions for the phase delays for the two frequencies $f_1$ and $f_2$ over the distance D may be obtained:

$$\phi_1 = \frac{2\pi D}{C_0} \cdot f_1(1+N_1) \quad (1)$$

$$\phi_2 = \frac{2\pi D}{C_0} \cdot f_2(1+N_2) \quad (2)$$

The heterodyning of $f_1$ and $f_2$ by photomultiplier 26 at receiver 20 results in a signal of the difference-frequency signal $f_1-f_2$ discussed which signal has a phase $$\phi_1 - \phi_2 = \frac{2\pi D}{C_0} \cdot (f_1 - f_2 + f_1 N_1 - f_2 N_2) \quad (3)$$

The actuation of the switch 18 to the position II therefrom position I is equivalent to a change in color for the two signals of frequencies $f_1$ and $f_2$, corresponding to the new value of phase difference $\phi_1-\phi_2$ obtained from Equation 3 by interchanging $N_1$ and $N_2$:

$$\phi_1' - \phi_2' = \frac{2\pi D}{C_0} \cdot (f_1 + f_2 + f_1 N_2 - f_2 N_1) \quad (4)$$

Thus if switch 18 is switched from position I to position II, a change in the output of phase detector 30 will be produced corresponding to the difference between the two values of Equations 3 and 4, or:

$$\phi_1 - \phi_2 - (\phi_1' - \phi_2') = \frac{2\pi D}{C_0} \cdot (f_1 + f_2) \cdot (N_1 - N_2) \quad (5)$$

If switch 18 is operated periodically, the output of phase detector 30 alternates between the first and the second values for each period, resulting in an output of rectangular waveform whose amplitude represents the difference according to Equation 5. This amplitude is displayed on the measuring instrument 32.

As is apparent from Equation 5, this value recorded by measuring instrument 32 is proportional to $N_1-N_2$. As was stated hereinabove, N is a function of pressure and temperature, and thus may be expressed by the equation $$N = N_0 \cdot \alpha \quad (6)$$

where $\alpha$ is a pressure- and temperature-dependent coefficient and $N_0$ is the value of N at standard pressure and temperature conditions. Designating the values of $N_0$ for the two colors as $N_{01}$ and $N_{02}$, respectively, we obtain the expression $$N_1 - N_2 = (N_{01} - N_{02}) \cdot \alpha \quad (7)$$

from which $\alpha$ can be determined, $N_1-N_2$ being determined as set forth above and $N_{01}$ and $N_{02}$ being known.

Considering Equation 5, it will be appreciated that a doubling of the measured value is obtained through the use of the switching technique described hereinabove. Without such a switching technique, and where only a single modulation frequency $f$ is used, there would be obtained a pase difference denoted $\phi_1''-\phi_2''$ corresponding to $f_1=f_2=f$ in Equation 3 in accordance with the expression:

$$\phi_1'' - \phi_2'' = \frac{2\pi D}{C_0} \cdot (N_1 - N_2) \cdot f \quad (8)$$

In accordance with a further mode of operation of the system of FIG. 1 a measurement of the refractive index may be obtained by using delay line 24 inserted in the path of beam B as shown. The delay line 24 is adjusted to compensate for the differences in the delay for the two color signals R and B such that these signals will be of equal phase at receiver 20. Thus, the adjustment of delay line 24 until measuring instrument 32 indicates a zero reading provides a measurement of the phase difference between the signal, measuring instrument 32 merely functioning as a null instrument under these circumstances.

Figure 2:
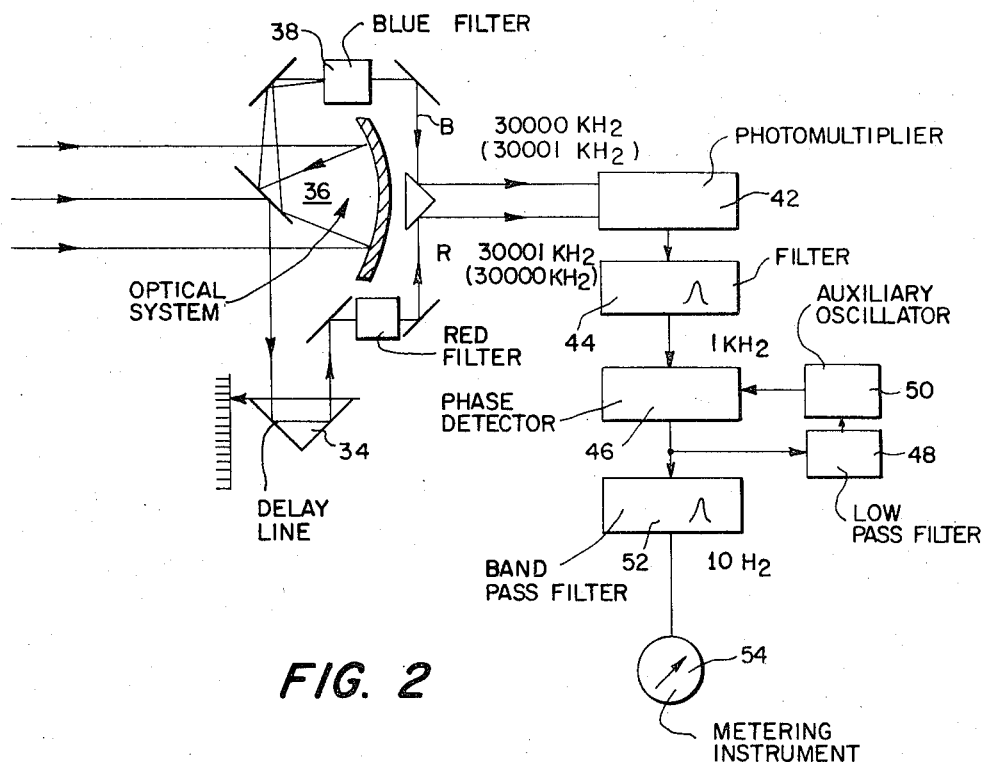
FIG. 2 is a schematic diagram of a modified form of the receiver of FIG. 1.

Referring to FIG. 2, a modified form of the embodiment of the receiver 20 of FIG. 1 is shown wherein a delay device such as a delay line 34 is used to equalize the delay for the two color signals at the receiver. The receiver of FIG. 2 includes an optical system which may be of a conventional construction and is shown only schematically. The optical system 36 divides the received light signal into first and second beams which are passed through a blue filter 38 and a red filter 40, respectively. The resultant single-color signals B and R are applied to a photomultiplier 42. As indicated in FIG. 2 the modulating frequencies may be 30,000 kHz. and 30,001 kHz., respectively so that the difference-frequency produced by the heterodyning performed by photomultiplier 32 is 1 kHz. A filter 44 separates out this desired 1 kHz. heterodyne frequency which is passed to a phase detector 46. The output of phase detector 46 is applied to a low pass filter 48 which controls an auxiliary oscillator 50, oscillator 50 applying a reference oscillation to pase detector 46. The output of pase detector 46 is also applied to a band pass filter 52 which is tuned to the frequency at which switch 18 of FIG. 1 is operated, this frequency being assumed to be 10 Hz. as discussed hereinabove. The output from band pass filter 52 is passed to a suitable measuring instrument 54. Considering the operation of the receiver of FIG. 2, delay line 34 is adjusted until metering instrument 54 reads zero thus indicating that the red and blue signals have the same phase when arriving at the receiver and that the delay provided by delay line 34 corresponds to the difference in phase between the two color signals over the path traversed. It will be noted that the receiver of FIG. 2 can be built into the same unit as the transmitter or the receiver may be located at the far end of the signal path, depending on whether or not a reflector-type system is used.

Figure 3:
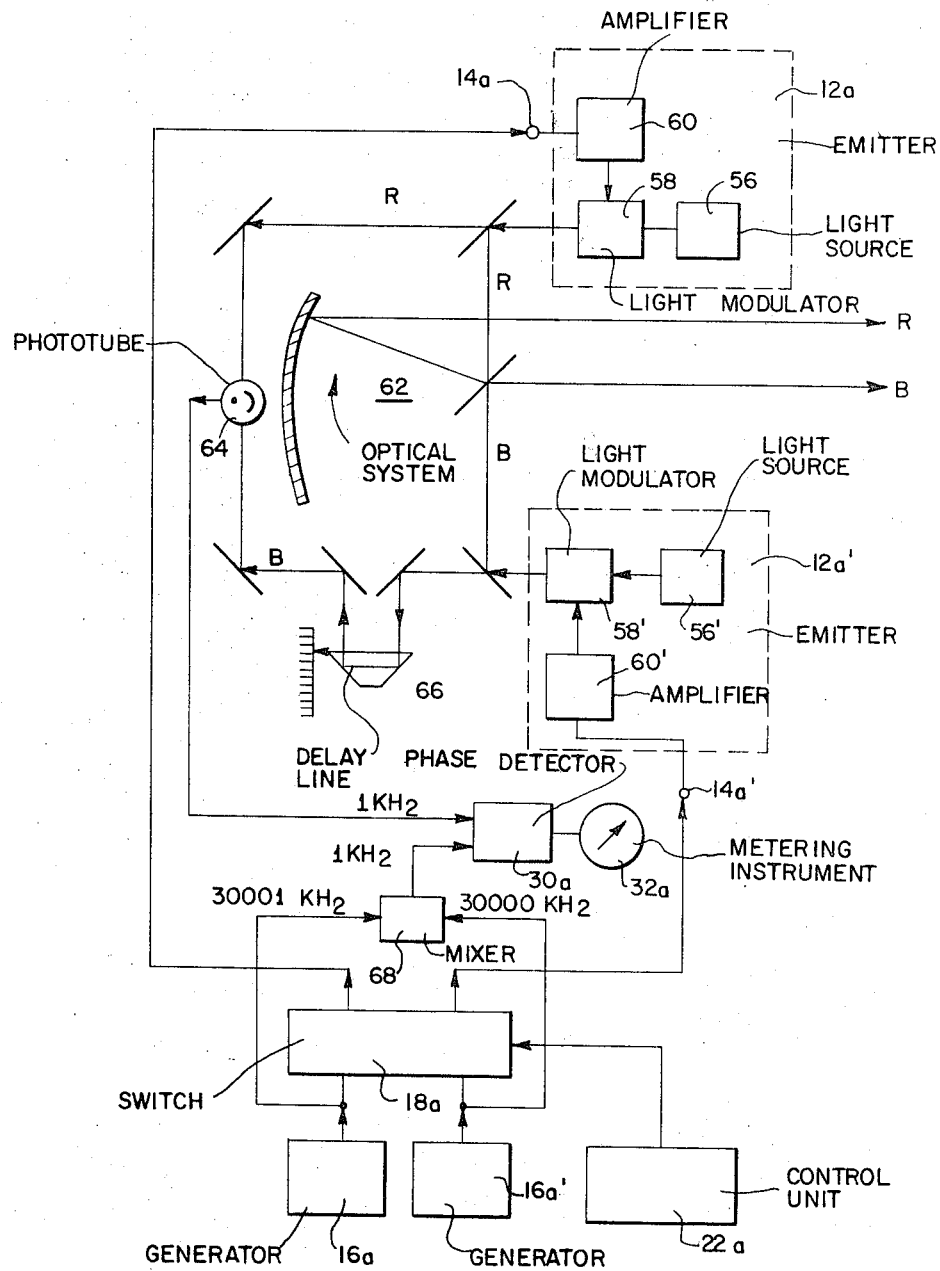
FIG. 3 is a schematic diagram of a modified form of the transmitter of FIG. 1.

Referring to FIG. 3, a modified embodiment of the transmitter 10 of FIG. 1 is shown. The system of FIG. 3 generally corresponds to that of FIG. 1 and similar elements therein have been given the same numbers with the letter *a* attached. The first emitter of the system of FIG. 3 which is thus designated 12*a* comprises a light source 56 for generating a beam of red light which is passed through a light modulator 58 to which is passed a modulating signal from an amplifier 60. The transmitter of FIG. 3 includes an optical system generally denoted 62 which may be of a conventional construction and is shown only schematically. The red beam produced by emitter 12*a* is split into two portions one of which is transmitted to a phototube 64. The second emitter 12*a'* similarly comprises a light source 56', a light modulator 58' and an amplifier 60' and produces a blue beam. The blue beam produced by emitter 12*a'* is split into a trans- to the phototube 64. Thus both beams are applied to phototube 64 which produces an output which is applied to one input of a phase detector 30*a*. The second input of phase detector 30*a* is connected to the output of a mixer 68 which has first and second inputs connected to the outputs of generators 16*a* and 16*a'*. The output of phase detector 30*a* is connected to a measuring instrument 32*a*. The transmitter of FIG. 3 also includes a switch 18*a* and a control unit 22*a* which operate as described hereinabove in connection with FIG. 1.

Considering the operation of the system of FIG. 3, the transmitter shown therein operates generally the same as the transmitter 10 of FIG. 1 but, in addition, measures any phase difference present at the transmitter if there is not a perfect balance between the emitters 12*a* and 12*a'*. Such an unbalance may arise, for example, where the delays provided in amplifiers 60 and 60' are not exactly the same for the two modulation frequencies. It is noted that if this unbalance is allowed to exist a corresponding phase difference will be present in the signals even before they leave the transmitter and, of course, this phase difference would be detected by the receiver and result in an incorrect reading reflecting the initial phase difference between the color signals. In general, the phototube 64, the delay line 66, the phase detector 30*a*, the measuring instrument 32*a* and the mixer 68 form an auxiliary receiver which is built into the transmitter itself. Thus the phase of the color signals can be adjusted through adjusting delay line 66 so that metering instrument 32*a* reads zero. The phototube 64 operates in a similar manner to photomultiplier tube 26 of FIG. 1 and serves to heterodyne the two color signals applied thereto to produce a 1 kHz. output signal. Mixer 68 provides a reference oscillation for phase detector 30*a*.

Although the invention has been described with reference to exemplary preferred embodiments thereof it will be understood that variations and modifications in the exemplary embodiments described may be effected without departing from the scope and spirit of the invention.

I claim:

1. An apparatus for measuring refractive index along a light path comprising first emitter means for transmitting a first light signal of a first color along the light path and having an input for receiving a modulating signal, second emitter means for transmitting a second light signal of a second color along the light path and having an input for receiving a modulating signal, modulating means for modulating the intensity of said first signal and for modulating the intensity of said second signal, said modulating means comprising first generating means for generating a signal of a first frequency, second generating means for generating a signal of a second frequency, and switching means for connecting said first generating means to the modulating signal receiving input of said first emitter means and for connecting said second generating means to the modulating signal receiving input of said second emitter means, in the first state thereof, and for connecting said first generating means to the modulating signal receiving input of said second emitter means and for connecting said second generating means to the modulating receiving input of said first emitter means, in the second state thereof, and receiving means for receiving said first and second light signals, said receiving means including a phase detector for producing an output in accordance with the difference in phase between said first and second signals, which output is a measure of the difference of refractive index for said first and second colors.

2. An apparatus as claimed in claim 1 wherein said receiving means further includes heterodyning means responsive to said first and second signals for producing a difference-frequency signal and for applying said difference-frequency signal to said phase detector.

3. An apparatus as claimed in claim 2 wherein said heterodyning means includes photomultiplier means for receiving said first and second signals.

4. An apparatus as claimed in claim 1 further comprising delay means for delaying one of said first and second signals before the transmission thereof along said light path.

5. An apparatus as claimed in claim 1 further comprising control means for causing periodic switching of said switching means between the first and second states thereof.

6. An apparatus as claimed in claim 4 further comprising a measuring instrument connected to the output of said phase detector, said measuring instrument comprising a null instrument.

7. An apparatus as claimed in claim 1 wherein said receiver further comprises an adjustable delay line for delaying one of said first and second signals and a null instrument responsive to the output of said phase detector.

References Cited

UNITED STATES PATENTS 3,366,957  1/1968  Lode.
3,369,445  2/1968  Kohl.

RONALD L. WIBERT, Primary Examiner

T. MAJOR, Assistant Examiner